Figure 1:
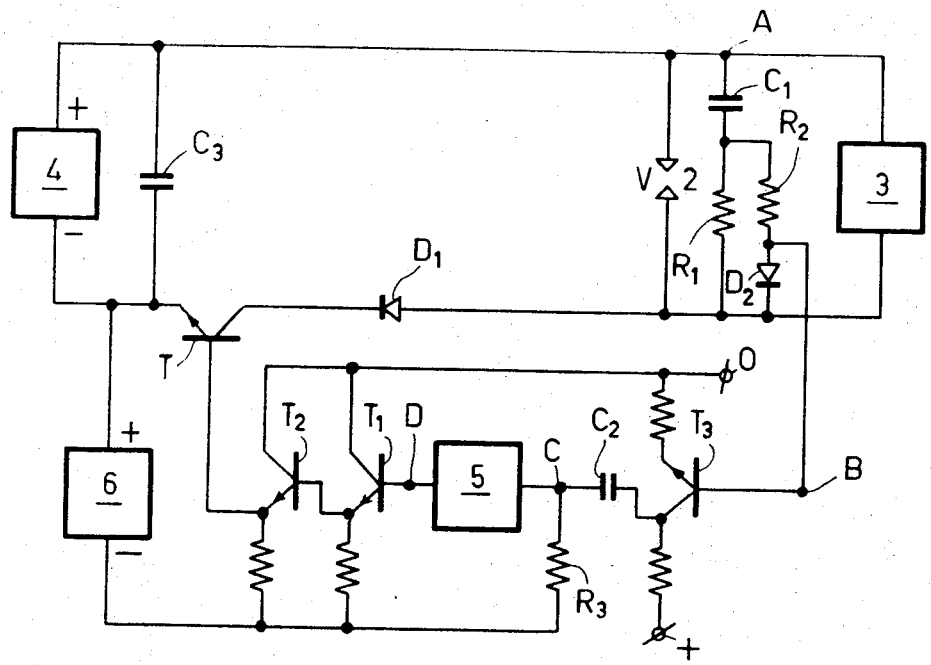

United States Patent [19]
van Osenbruggen et al.

[11] 3,757,073
[45] Sept. 4, 1973

[54] CONSTANT-CURRENT-DENSITY METHOD OF MACHINING A WORK-PIECE BY MEANS OF SPARK EROSION

[75] Inventors: Cornelis van Osenbruggen; Adriaan Abraham Van der Veeke, both of Emmasingel, Eindhoven, Netherlands

[73] Assignee: U.S. Philips Corporation, New York, N.Y.

[22] Filed: Jan. 21, 1971

[21] Appl. No.: 108,525

[30] Foreign Application Priority Data
Feb. 4, 1970 Netherlands.................... 7001538

[52] U.S. Cl................................................ 219/69 C
[51] Int. Cl............................................... B23p 1/08
[58] Field of Search....................... 219/69 C, 69 P

[56] References Cited
UNITED STATES PATENTS
3,588,431 6/1971 Pekelharing .................... 219/69 C

*Primary Examiner*—R. F. Staubly
*Attorney*—Frank R. Trifari

[57] ABSTRACT

A method and a device for machining a work-piece by means of spark erosion are described, in which a breakdown is produced in a discharge space formed by the work-piece and a tool electrode which are connected to a supply source. It is shown that the current density in the discharge space may be maintained substantially constant by switching a stabilized voltage source across the discharge space at the instant of breakdown.

16 Claims, 4 Drawing Figures

PATENTED SEP 4 1973

3,757,073

SHEET 1 OF 2

*INVENTORS.*
CORNELIS VAN OSENBRUGGEN
ADRIAAN A. VAN DER VEEKE

BY

AGENT

CONSTANT-CURRENT-DENSITY METHOD OF MACHINING A WORK-PIECE BY MEANS OF SPARK EROSION

This invention relates to a method of machining a work-piece by means of spark erosion, in which method a breakdown is produced in a discharge space formed by the work-piece and a tool electrode which are connected to a supply source, the electric current density through a discharge channel being maintained substantially constant. The invention also relates to a device for carrying out the said method.

Dutch Pat. application No. 6.704.507 (U.S. Pat. No. 3,588,431) describes such a device and such a method. As has been described therein, the current density in the discharge space should not exceed a given value in view of wear of the tool electrode. On the other hand, the current density must be high enough to achieve maximum erosion of the work piece. According to the said patent an optimum result is obtainable by causing the current amplitude of the electric pulses to increase in the course of the pulse duration while the pulses have steep leading and trailing edges. If, in the course of the pulse duration, the cross-sectional area of the discharge channel increases in proportion to the current amplitude, the current density in the discharge channel will remain substantially unchanged. A disadvantage of this method is that the cross-sectional areas of the discharge channels which are successively produced in the discharge space will not be equal so that, with the current amplitudes of the electric pulses remaining unchanged, the current densities in the successively produced discharge channels will not be equal.

The method according to the invention obviates the said disadvantage. For this purpose, the said method is characterized in that at the instant of breakdown a stabilized voltage source is connected to the discharge space.

The invention is based on the recognition that optimum current density in a discharge may best be approximated by producing a constant voltage drop across the discharge space at the site of the discharge. Thus, the current density in a discharge channel is controlled for each discharge.

Whereas in the method according to the aforementioned Patent the current through the discharge space has a predetermined value and the current density in a discharge channel is determined by the variation of the current amplitude of the electric pulse and the cross-sectional area of the discharge channel, in the method according to the invention the current is determined by the discharge channel, in other words, a change in the discharge channel entails a change in the current.

It should be noted that the use of two voltage sources in spark erosion process is known, inter alia from the German Pat. specification No. 1,294,160. In the method described in the German specification, a direct-voltage source, the voltage of which is higher than the arc voltage of the discharge but lower than the ignition voltage, is permanently connected across the discharge space. The discharge is started and extinguished by voltage pulses superposed on the direct voltage. The object is to restrict the energy to be delivered by the pulse generator.

In an arrangement described in the Published German Pat. application No. 1,299,204 low-energy discharges are produced in the discharge space by a direct-voltage source. Thus, it is ascertained whether the physical condition of the discharge space is suitable for high-energy working discharges to be produced in the discharge space by a pulse generator.

In the said Patent specification as well as in the said Published Patent application the use of the two voltage sources has another object than in the method according to this invention.

It is a further feature of the method according to the invention that the voltage supplied by the stabilized voltage source is applied across the discharge space by a control signal. This control signal is derived from the voltage across the discharge space by means of a differentiating network.

In addition, there may be derived from the voltage across the discharge space a second control signal by means of which the magnitude of the voltage applied across the discharge space by the stabilized voltage source is controlled.

A device for carrying out the method according to the invention, in which device the circuit of the stabilized voltage source includes a switch, is characterized in that a monostable multivibrator is connected in the control circuit between the said switch and the discharge space. This monostable multivibrator prolongs the pulse duration of a pulse which appears at its input.

According to a further feature of a device for carrying out the method according to the invention, an amplifier is connected between the monostable multivibrator and the switch.

The said amplifier may comprise two transistors connected as emitter followers.

A device for carrying out the method according to the invention, in which the voltage across the discharge space in addition to being switched is also controlled in magnitude, is characterized in that the amplifier is a differential amplifier one input of which is connected to a reference voltage source, the second input being connected to a voltage divider connected across the discharge space.

In the said devices a bistable multivibrator may be included in the control circuit between the discharge space and the monostable multivibrator.

Figure 2:
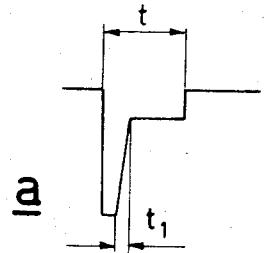
Figure 2:
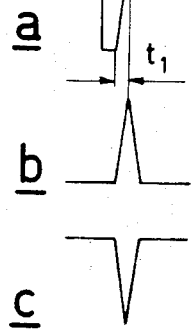
Figure 4:
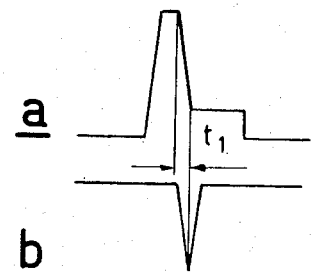
Figure 4:
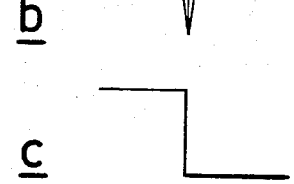
Figure 3:
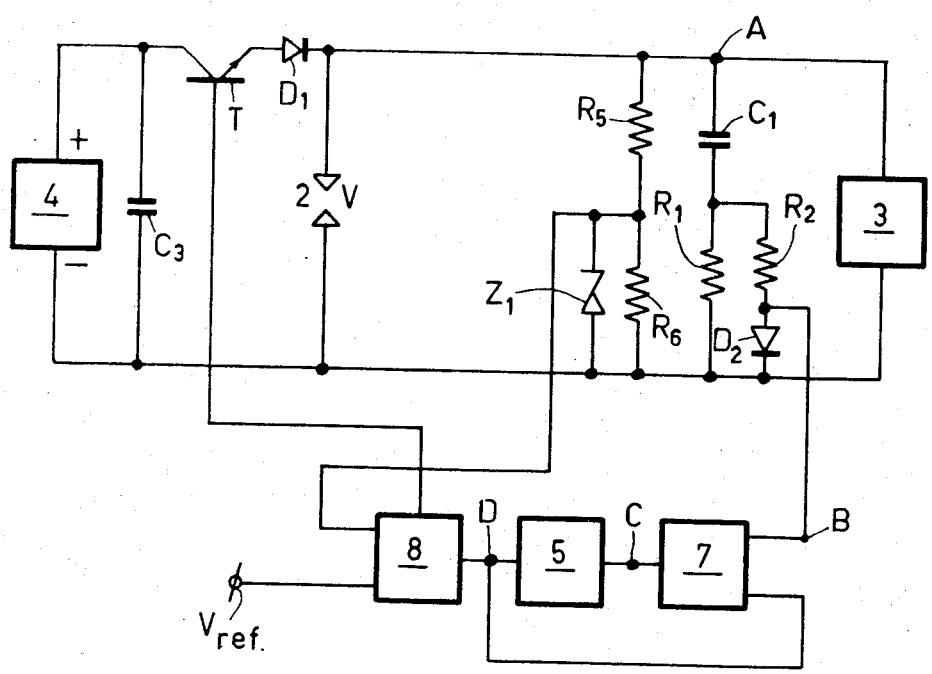

Embodiments of the invention will now be described, by way of example, with reference to the accompanying diagrammatic drawings, in which:

FIGS. 1 and 3 show embodiments of a device for carrying out the method according to the invention, and FIGS. 2 and 4 show the voltage pulses at various points of the devices shown in FIGS. 1 and 3.

Referring now to FIG. 1, there is shown a pulse generator 3. The tool electrode and the work piece, which are connected to the terminals of the pulse generator, form a discharge space 2. This discharge space is connected to a stabilized voltage source 4 through a diode $D_1$ and a transistor T. A differentiating network $C_1$, $R_1$, $R_2$ is connected in parallel with the discharge space. The output of the differentiating network is connected to the base of a transistor $T_3$. A monostable multivibrator 5 is connected to the collector of the transistor $T_3$ through a capacitor $C_2$, the output of this monostable multivibrator being connected to the cascade combination of two emitter followers $T_1$ and $T_2$. The output of the series combination is connected to the base of the transistor T. A buffer capacitor $C_3$ is connected in parallel with the supply source 4.

The circuit arrangement operates as follows: The generator 3 produces short-duration high-voltage ignition pulses so that at regular intervals discharges are produced in the discharge space 2. FIG. 2 shows the voltage pulses which will appear at points A (FIG. 2a), B (FIG. 2b), C (FIG. 2c) and D (FIG. 2d) as a result of the application of an ignition pulse. In this Figure, time is plotted along the horizontal axis and the positive and negative voltages are plotted along the vertical axis. At the breakdown instant the voltage across the discharge space drops to the arc voltage in a very short time interval $t_1$ (see FIG. 2a). The time derivative of this voltage drop (see FIG. 2b) which is produced by the differentiating network $C_1$, $R_1$, $R_2$ is applied to the base of the transistor $T_3$. This transistor changes the sign of the pulse so as to render it suitable for switching the monostable multivibrator 5 (see FIG. 2c). At the output of the monostable multivibrator a pulse is produced the duration $t_2$ of which is determined by the adjustable time constant of this multivibrator (see FIG. 2d). The output pulse of the monostable multivibrator is transferred unchanged to the base of the transistor T by the two emitter followers $T_1$ and $T_2$ and as a result the transistor T becomes conductive. The output impedance of the two emitter followers is low enough for a sufficient part of the pulse to be transferred. Since the transistor T is conductive during the pulse duration $t_2$ the discharge is maintained by the supply source 4 and the buffer capacitor $C_3$. The buffer capacitor provides the advantage that it enables a large amount of charge to be delivered within a short time. The buffer capacitor is charged by the stabilized voltage source 4.

At the end of the pulse duration $t_2$ the monostable multivibrator returns to its initial condition. The transistors $T_1$ and $T_2$ are cut off, as is the transistor T. The arc discharge across the discharge space is extinguished. At the next pulse from the generator 3 the cycle is repeated.

The buffer capacitor $C_3$ is made so large that the amount of charge transported across the discharge space during the arc discharge involves only a small voltage drop of, for example, at most 0.1 volt.

There may be connected in series with the transistor T a protection diode $D_1$ which prevents the ignition pulse from being applied to the transistor T. The operating points of the transistors $T_1$ and $T_2$ are adjusted by means of the negative voltage source 6. The capacitor $C_2$ and a resistor $R_3$ have been included to lower the voltage level of the pulse at the input of the monostable multivibrator. It should be noted that the transistor $T_3$ is required only to change the sign of the pulse in order to render the pulse suitable for the monostable multivibrator. Instead of the pulse generator a voltage source may be used to produce a spark discharge. In the device described, the switch is in the form of one transistor. Alternatively, several transistors may be connected in parallel. Further, other switches, such as thyristors, may be used. However, the voltage drop across a conductive thyristor is greater than that across a conductive transistor. In addition, a thyristor does not permit the use of switching frequencies as high as are obtainable with a transistor.

In a practical embodiment of the device described, the generator 3 delivered 300 volt ignition pulses having a pulse duration $(t)$ of 2 /usec. During the spark discharge the current was 4 amperes. The arc voltage was 20 volts and was reached in 20 nanoseconds.

FIG. 3 shows another embodiment of a device according to the invention. In this Figure, elements corresponding to those of FIG. 1 have been designated by the same reference symbols. The device shown in FIG. 3 is distinguished from that shown in FIG. 1 by an additional voltage divider $R_5$, $R_6$ being connected across the discharge space. In this Figure, the amplifier circuit 8 is a differential amplifier. Finally, a bistable multivibrator 7 is substituted for the reversing stage.

The output of the bistable multivibrator 7 is connected to the monostable multivibrator 5, one of the two inputs of the multivibrator 7 being connected to the differentiating network $C_1$, $R_1$, $R_2$ and the other being connected to the output of the monostable multivibrator. The signal derived from the voltage divider $R_5$, $R_6$ is compared with a reference voltage $V_{ref}$ in the differential amplifier 8.

FIG. 4 again shows voltage pulses at points A (FIG. 4a), B (FIG. 4b), C (FIG. 4c) and D (FIG. 4d).

The operation of the device is as follows:

A short-duration pulse (FIG. 4b) from the differentiating network changes the output voltage of the bistable multivibrator 7 from a positive value to zero. (FIG. 4c). This change gives rise to the appearance of a negative pulse at the output of the monostable multivibrator, the duration of this pulse being determined by the time constant of this multivibrator(FIG. 4d). This pulse connects the differential amplifier to its supply voltage source, not shown. So far the transistor T had been cut off because its base voltage was negative with respect to its emitter voltage. When the differential amplifier is connected to its supply voltage, the output voltage of the differential amplifier determines the base voltage of the transistor T. A reference voltage $V_{ref}$ is applied to one of the inputs of the differential amplifier 8, the signal derived from the voltage divider $R_5$, $R_6$ being applied to the other input.

The output signal of the differential amplifier 8 controls the transistor T in a sense such that when the voltage across $R_6$ is lower than the reference voltage, the transistor T becomes more highly conductive so that the voltage across the discharge space increases. If, however, the voltage across $R_6$ is higher than the reference voltage, the transistor T will become less conductive so that the voltage across the discharge space decreases. Thus, the voltage across the discharge space is determined by the reference voltage. As a result, the voltage drop across the buffer capacitor is reduced in importance and may vary between ½ volt and 1 volt. The voltage source 4 supplies a voltage which is a few volts higher than the desired arc voltage.

At the end of the pulse from the monostable multivibrator, the bistable multivibrator changes state so that its output becomes positive. The supply voltage for the differential amplifier is switched off and the base voltage of the transistor T becomes negative again so that the transistor T is again cut off. At the next ignition pulse from the generator the cycle is repeated.

To prevent the high ignition voltage from being applied to the input of the differential amplifier a Zener diode $Z_1$ is connected in parallel with the resistor $R_6$. In this embodiment also, the generator 3 supplies 300 volt ignition pulses having a duration of 2 /usec. Here also, the current was 4 amperes during the arc discharge. The arc voltage was 20 volts and was reached in 20 nanoseconds.

What is claimed is:

1. A method of machining a work-piece by means of spark erosion comprising the steps of first producing a voltage breakdown in the discharge space between the workpiece and a spark electrode by applying a voltage across said discharge space, and thereafter connecting a stabilized voltage source to the discharge space at the instant of breakdown so that the electric current density through a discharge channel in the discharge space is maintained substantially constant.

2. A spark erosion device for electrically machining a workpiece comprising, an electrode adapted to be positioned adjacent the workpiece to define therewith a spark discharge space, a stabilized source of voltage, means for producing a breakdown in said discharge space, and means for connecting said stabilized voltage source across the discharge space at the instant of breakdown whereby the electric current density through a discharge channel in the discharge space is maintained substantially constant.

3. A device as claimed in claim 2 further comprising means for deriving a control signal from the voltage across the discharge space, and control circuit means responsive to the control signal for operating said connecting means to cause the voltage supplied by the stabilized voltage source to be applied across the discharge space.

4. A device as claimed in claim 3 wherein said connecting means comprises a switching member connected in circuit with the stabilized voltage source and the discharge space, and said control circuit means comprises a monostable multivibrator connected between the switching member and the discharge space.

5. A device as claimed in claim 4, characterized in that an amplifier is connected between the monostable multivibrator and the switching member.

6. A device as claimed in claim 5, characterized in that the amplifier comprises two cascaded transistors connected as emitter followers.

7. A device as claimed in claim 4 wherein said control circuit means further comprises a bistable multivibrator connected between the discharge space and the monostable multivibrator.

8. A device as claimed in claim 3 further comprising means for deriving a second control signal from the voltage across the discharge space, and means responsive to the second control signal for controlling the amplitude of the voltage set up across the discharge space by the stabilized voltage source.

9. A device as claimed in claim 8 further comprising a differential amplifier connected between the monostable multivibrator and the switching member and one input of which is connected to a reference voltage source, and means connecting a second input of said amplifier to a voltage divider connected across the discharge space to derive said second control signal.

10. A device as claimed in claim 8 wherein said connecting means comprises a switching member connected between the stabilized voltage source and the discharbe space, and said control circuit means comprises a monostable multivibrator connected between the switching member and the discharge space.

11. A device as claimed in claim 3 wherein said control signal deriving means includes a differentiating network.

12. A device as claimed in claim 2 wherein said connecting means comprises a controlled switching member connected in series circuit with said stabilized voltage source and said discharge space, said device further comprising means responsive to the voltage across the discharge space for producing a control signal that operates said switching member at the instant of breakdown and maintains said switching member operated for a predetermined time period.

13. A device as claimed in claim 12 further comprising means responsive to the voltage across the discharge space for deriving a second control signal that varies the impedance of the switching member as a function thereof thereby to control the amplitude of the voltage developed across the discharge space by the stabilized voltage source.

14. A device as claimed in claim 13 wherein said breakdown producing means comprises a pulse generator that supplies voltage pulses that are of short duration relative to said predetermined time period, and wherein the input circuit of said second control signal deriving means includes means for limiting the amplitude of the input signal applied thereto from across the discharge space.

15. A spark erosion device for electrically machining a workpiece comprising, an electrode adapted to be positioned adjacent the workpiece to define therewith a spark discharge gap, a stabilized source of constant voltage, means for applying a predetermined voltage to said discharge gap to produce a breakdown therein, and means for selectively connecting said stabilized voltage source across the discharge gap in response to and at the instant of gap breakdown whereby the electric current density through a discharge channel in the discharge gap is maintained substantially constant.

16. A device as claimed in claim 15 wherein said stabilized voltage source comprises a capacitor and means for charging the capacitor in a non-resonant manner.

* * * * *